United States Patent
Whitney et al.

(10) Patent No.: US 8,311,721 B2
(45) Date of Patent: Nov. 13, 2012

(54) RESERVE TORQUE FOR LEAN EQUIVALENCE RATIO REQUESTS

(75) Inventors: Christopher E. Whitney, Highland, MI (US); Robert J. Genslak, Macomb, MI (US); Edward Stuteville, Linden, MI (US); Cheryl A. Williams, Howell, MI (US); Robert C. Simon, Jr., Brighton, MI (US)

(73) Assignee: GM Global Technology Operations LLC

( * ) Notice: Subject to any disclaimer, the term of this patent is extended or adjusted under 35 U.S.C. 154(b) by 1002 days.

(21) Appl. No.: 12/334,778

(22) Filed: Dec. 15, 2008

(65) Prior Publication Data

US 2009/0241899 A1 Oct. 1, 2009

Related U.S. Application Data

(60) Provisional application No. 61/039,524, filed on Mar. 26, 2008.

(51) Int. Cl.
*B60T 7/12* (2006.01)
*G05D 1/00* (2006.01)
*G06F 7/00* (2006.01)
*G06F 17/00* (2006.01)
*F02P 5/15* (2006.01)
*F02M 51/00* (2006.01)

(52) U.S. Cl. .......... 701/103; 701/114; 123/406.23; 123/478; 60/277; 60/285

(58) Field of Classification Search .......... 701/102, 701/103, 104, 106, 109, 114; 123/406.23, 123/406.47, 436, 478, 679, 568.21; 60/277, 60/285

See application file for complete search history.

(56) References Cited

U.S. PATENT DOCUMENTS

| | | | |
|---|---|---|---|
| 4,632,285 A | 12/1986 | Dillingham | |
| 5,413,078 A * | 5/1995 | Mitsunaga et al. | 123/492 |
| 6,662,782 B2 * | 12/2003 | Iida et al. | 123/406.47 |
| 6,848,417 B2 * | 2/2005 | Surnilla et al. | 123/339.11 |
| 7,181,908 B2 * | 2/2007 | Naik | 60/295 |
| 2006/0102143 A1 * | 5/2006 | Yagi | 123/339.11 |
| 2007/0010931 A1 * | 1/2007 | Kraemer et al. | 701/109 |
| 2009/0024263 A1 * | 1/2009 | Simon et al. | 701/22 |
| 2009/0037073 A1 * | 2/2009 | Jung et al. | 701/101 |

OTHER PUBLICATIONS

U.S. Appl. No. 11/145,284, filed Jun. 3, 2005, Wenbo Wang.

* cited by examiner

*Primary Examiner* — Willis R Wolfe, Jr.
*Assistant Examiner* — Anthony L Bacon

(57) ABSTRACT

A reserve torque system comprises a first module and a reserve torque module. The first module generates a first signal a predetermined period before an equivalence ratio (EQR) of an air/fuel mixture supplied to an engine is transitioned from a non-lean EQR to a lean EQR. The reserve torque module creates a reserve torque between when the first signal is generated and when the EQR is transitioned to the lean EQR.

20 Claims, 9 Drawing Sheets

RESERVE TORQUE FOR LEAN EQUIVALENCE RATIO REQUESTS

CROSS-REFERENCE TO RELATED APPLICATIONS

This application claims the benefit of U.S. Provisional Patent Application No. 61/039,524, filed on Mar. 26, 2008. The disclosure of the above application is incorporated herein by reference in its entirety.

FIELD

The present disclosure relates to internal combustion engines and more particularly to torque compensation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

A reserve torque system comprises a first module and a reserve torque module. The first module generates a first signal a predetermined period before an equivalence ratio (EQR) of an air/fuel mixture supplied to an engine is transitioned from a non-lean EQR to a lean EQR. The reserve torque module creates a reserve torque between when the first signal is generated and when the EQR is transitioned to the lean EQR.

In other features, the reserve torque system further comprises an actuation module. The actuation module increases at least one engine airflow parameter and retards spark timing before the EQR is transitioned to the lean EQR.

In still other features, the actuation module maintains the at least one engine airflow parameter until the EQR is transitioned from the lean EQR to a second non-lean EQR.

In further features, the first module transitions the EQR from the non-lean EQR to a rich EQR during a first period and transitions the EQR from the rich EQR to the lean EQR during a second period that is after the first period. The non-lean EQR is a stoichiometric EQR. The actuation module increases the at least one engine airflow parameter before the first period and maintains the at least one engine airflow parameter until the EQR is transitioned from the lean EQR to the second non-lean EQR.

In still further features, the actuation module retards the spark timing when the at least one engine airflow parameter increases and further retards the spark timing while the EQR transitions from the non-lean EQR to the rich EQR.

In other features, the first module generates a second signal based on the lean EQR and the reserve torque module creates the reserve torque based on the second signal.

In still other features, the first module transitions the EQR to the lean EQR after the reserve torque is created.

In further features, the first module transitions the EQR to the lean EQR a predetermined period after the first signal is generated.

In still further features, the first module selectively diagnoses a fault in a catalyst associated with the engine after the EQR is transitioned to the lean EQR.

In other features, the first module selectively diagnoses the fault based on a change in oxygen of exhaust gas measured after the EQR is transitioned to the lean EQR.

A method comprises generating a first signal a predetermined period before an equivalence ratio (EQR) of an air/fuel mixture supplied to an engine is transitioned from a non-lean EQR to a lean EQR and creating a reserve torque between when the first signal is generated and when the EQR is transitioned to the lean EQR.

In other features, the method further comprises increasing at least one engine airflow parameter before the EQR is transitioned to the lean EQR and retarding spark timing before the EQR is transitioned to the lean EQR.

In still other features, the method further comprises maintaining the at least one engine airflow parameter until the EQR is transitioned from the lean EQR to a second non-lean EQR.

In further features, the method further comprises transitioning the EQR from the non-lean EQR to a rich EQR during a first period, wherein the non-lean EQR is a stoichiometric EQR; transitioning the EQR from the rich EQR to the lean EQR during a second period that is after the first period; increasing the at least one engine airflow parameter before the first period; and maintaining the at least one engine airflow parameter until the EQR is transitioned from the lean EQR to the second non-lean EQR.

In still further features, the method further comprises retarding the spark timing as the at least one engine airflow parameter increases and further retarding the spark timing as the EQR transitions from the non-lean EQR to the rich EQR.

In other features, the method further comprises generating a second signal based on the lean EQR and creating the reserve torque based on the second signal.

In still other features the method further comprises transitioning the EQR to the lean EQR after the reserve torque is created.

In further features, the method further comprises transitioning the EQR to the lean EQR a predetermined period after the first signal is generated.

In still further features, the method further comprises selectively diagnosing a fault in a catalyst associated with the engine after the EQR is transitioned to the lean EQR.

In other features, the method further comprises selectively diagnosing the fault based on a change in oxygen of exhaust gas measured after the EQR is transitioned to the lean EQR.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
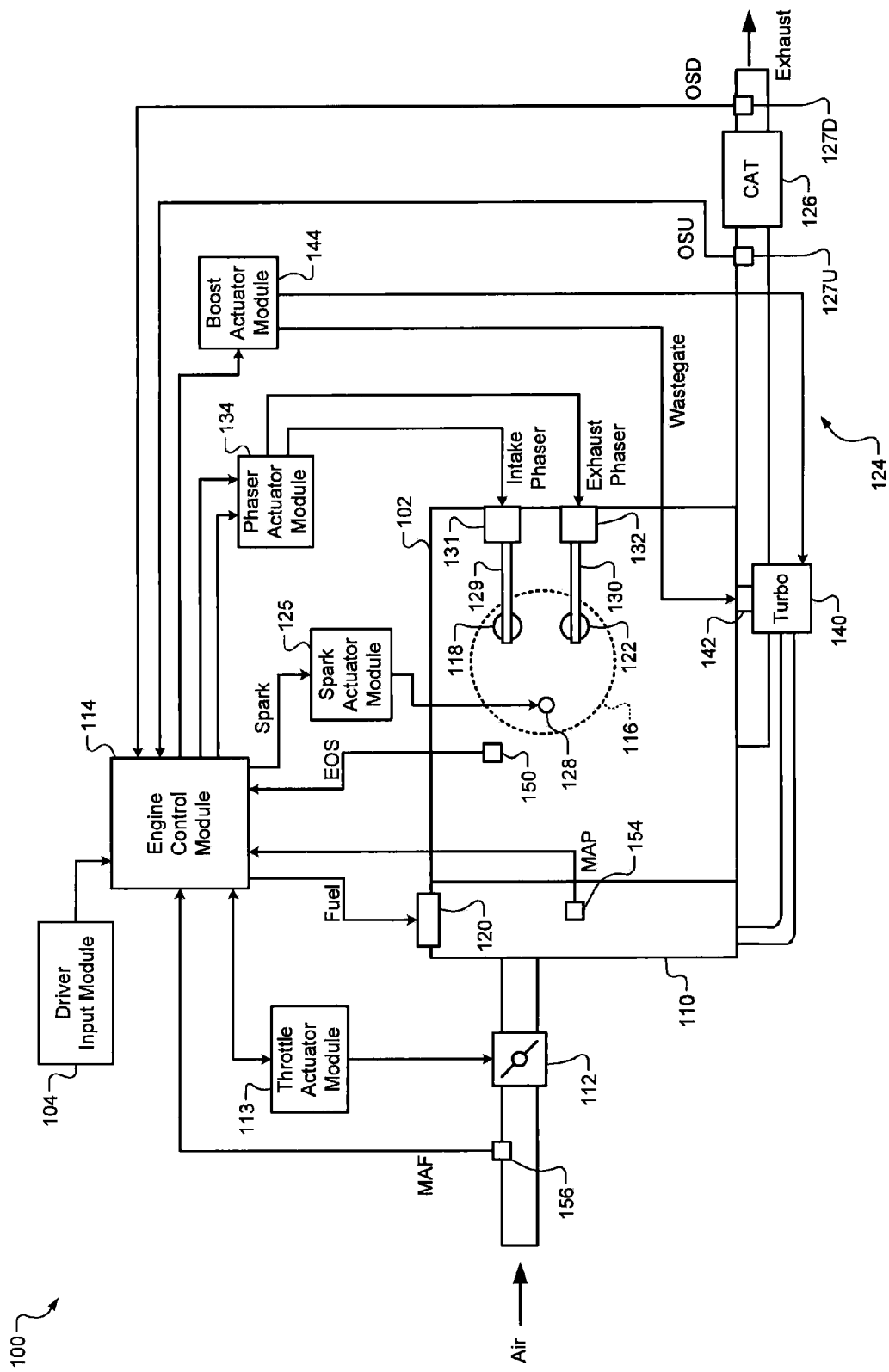
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine control module (ECM) controls an equivalence ratio (EQR) of an air/fuel mixture combusted within an engine. For example, the ECM may control the EQR based on a stoichiometric EQR during normal engine operation. In some circumstances, however, the ECM may receive a command to adjust the EQR to a lean EQR (i.e., EQR<stoichiometric EQR).

The ECM according to the present disclosure creates a reserve torque before adjusting the EQR to the lean EQR. More specifically, the ECM increases at least one engine airflow parameter (e.g., throttle opening) and retards spark timing, thereby creating a reserve torque. This reserve torque may be used to smooth the torque output when the EQR is adjusted to the lean EQR. Without the reserve torque, a sag (i.e., a decrease) in the torque output may occur when the EQR is transitioned to the lean EQR.

In some circumstances, the EQR may be transitioned to a rich EQR (i.e., EQR>stoichiometric EQR) before or after the EQR is transitioned to the lean EQR. In such circumstances, the ECM according to the present disclosure may create the reserve torque before the EQR is transitioned to the rich EQR. If the EQR is transitioned from the lean EQR to the rich EQR, the increased engine airflow parameters used to create the reserve torque are maintained during the rich EQR while the spark timing is retarded. This reserve torque may later be used to smooth the torque output when the EQR is adjusted from the rich EQR to the stoichiometric EQR. Without the reserve torque, a sag in the torque output may also occur when the EQR is transitioned from the rich EQR to a non-rich EQR (e.g., stoichiometric EQR).

Referring now to FIG. 1, a functional block diagram of an engine system 100 is presented. The engine system 100 includes an engine 102 that combusts an air/fuel mixture to produce drive torque for a vehicle based on a driver input module 104. The engine system 100 may be of a hybrid vehicle, such as a series-type hybrid vehicle or a parallel-type hybrid vehicle. Air is drawn into an intake manifold 110 through a throttle valve 112. An engine control module (ECM) 114 commands a throttle actuator module 113 to regulate opening of the throttle valve 112, thereby controlling airflow into the intake manifold 110.

Air from the intake manifold 110 is drawn into a cylinder 116 through an associated intake valve 118. While the engine 102 may include multiple cylinders, for illustration purposes only, the representative cylinder 116 is shown. For example only, the engine 102 may include 2, 3, 4, 5, 6, 8, 10, and/or 12 cylinders.

The ECM 114 also controls the amount of fuel injected by a fuel injection system 120. For example, the fuel injection system 120 may inject fuel based on a signal from the ECM 114. The ECM 114 may adjust the amount of fuel injected by adjusting the length of the signal (i.e., pulse width). In various implementations, the fuel injection system 120 injects fuel into the intake manifold 110 at a central location. In other implementations, fuel may be injected into the intake manifold 110 at multiple locations, such as near the intake valve of each of the cylinders. Alternatively, fuel may be injected directly into the cylinders.

The injected fuel mixes with the air and creates the air/fuel mixture. A piston (not shown) within the cylinder 116 compresses the air/fuel mixture within the cylinder 116. A spark actuator module 125 energizes a spark plug 128 associated with the cylinder 116 based on a signal from the ECM 114. In this manner, the ECM 114 controls the timing of the spark (i.e., spark timing).

The spark timing may be specified relative to the time when the piston is at its topmost position, referred to as to top dead center (TDC), the point at which the air/fuel mixture is most compressed. For example only, the spark timing may be set to a minimum spark retard (relative to TDC) at which a maximum braking torque is output. This spark timing is referred to as a maximum braking torque (MBT) spark timing.

The combustion of the air/fuel mixture drives the piston down (i.e., away from the TDC position), thereby driving a rotating crankshaft (not shown). The piston then begins moving up again and expels the byproducts of combustion through an associated exhaust valve 122. The byproducts of combustion are exhausted from the vehicle via an exhaust system 124.

The exhaust system 124 includes a catalytic converter 126 (CAT). The catalytic converter 126 includes one or more catalysts that react with various components of the exhaust gas. Oxygen sensors 127U and 127D measure concentration of oxygen in the exhaust gas and are located upstream and downstream of the catalytic converter 126, respectively.

An intake camshaft 129 may control opening of the intake valve 118, while an exhaust camshaft 130 may control opening of the exhaust valve 122. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The time at which the intake valve 118 is opened may be varied with respect to piston TDC by an intake cam phaser 131. The time at which the exhaust valve 122 is opened may be varied with respect to piston TDC by an exhaust cam phaser 132. A phaser actuator module 134 controls the intake cam phaser 131 and the exhaust cam phaser 132 based on signals from the ECM 114.

The engine system 100 may include a boost device that provides pressurized air to the intake manifold 110. For example, FIG. 1 depicts a turbocharger 140. Alternate engine systems may include a supercharger (not shown) that provides compressed air to the intake manifold 110 and is driven by the crankshaft.

The turbocharger 140 is powered by exhaust gases flowing through the exhaust system 124, and provides a compressed air charge to the intake manifold 110. The air used to produce the compressed air charge may be taken from the intake manifold 110. Compression of the air and/or heat radiated by the exhaust system 124 may heat the compressed air charge. An intercooler (not shown) may also be included to decrease the temperature of the compressed air charge.

A wastegate 142 may also be included to allow exhaust gas to bypass the turbocharger 140, thereby reducing the output (or boost) of the turbocharger 140. The ECM 114 controls the turbocharger 140 via a boost actuator module 144. The boost actuator module 144 may modulate the boost of the turbocharger 140 by controlling the position of the wastegate 142.

Various control mechanisms (i.e., actuators) of the engine system 100 may vary respective engine parameters of the engine 102. For example, the throttle actuator module 113 may change the opening of the throttle valve 112 (i.e., an actuator position). Similarly, the spark actuator module 125 may control an actuator position that corresponds to spark timing.

Other control mechanisms that vary engine parameters include, for example, the phaser actuator module 134, the boost actuator module 144, and the fuel injection system 120. The term actuator position with respect to these control mechanisms may correspond to intake and exhaust cam phaser angles, boost pressure and EGR valve opening, and amount of fuel injected, respectively.

Various sensors may be used to measure various engine parameters throughout the engine system 100. The ECM 114 may use signals from the sensors to make control decisions for the engine system 100 and/or adjust actuator positions. The sensors may include an engine output speed (EOS) sensor 150, a manifold absolute pressure (MAP) sensor 154, and/or a mass airflow (MAF) sensor 156. Other sensors that are not shown in FIG. 1 may include, for example, an engine coolant temperature (ECT) sensor, an oil temperature sensor, an intake air temperature (IAT) sensor, and/or any other suitable sensor.

The EOS sensor 150 measures the output speed of the engine 102 in revolutions per minute (rpm) based on rotation of the crankshaft. The MAP sensor 154 measures the pressure within the intake manifold 110. In various implementations, engine vacuum may be measured, where engine vacuum is the difference between ambient air pressure and the pressure within the intake manifold 110. The MAF sensor 156 measures the mass flowrate of air into the engine 102. While the MAF sensor 156 is depicted as being located upstream of the throttle valve 112, the MAF sensor 156 may be located in any suitable location, such as in a common packaging with the throttle valve 112.

Figure 2:
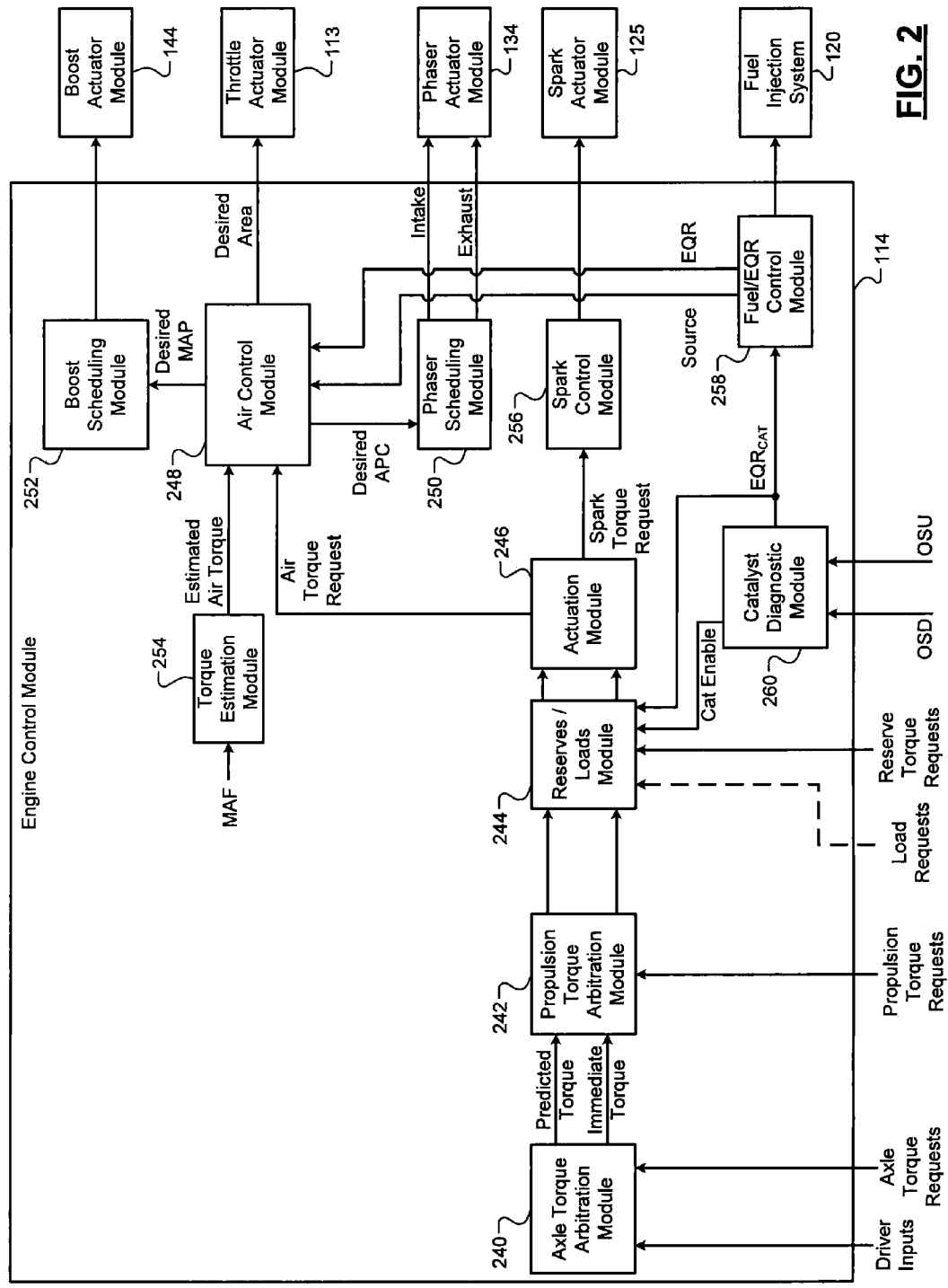
FIG. 2 is a functional block diagram of an exemplary engine control system according to the principles of the present disclosure.

Referring now to FIG. 2, a functional block diagram of an exemplary engine control system 200 is presented. The ECM 114 includes an axle torque arbitration module 240 that arbitrates between driver inputs from the driver input module 104 and other axle torque requests. For example, driver inputs may include accelerator pedal position. Axle torque requests may include torque reduction requested during wheel slip by a traction control system and/or torque requests to control speed from a cruise control system.

Axle torque requests may also include requests from an adaptive cruise control module, which may vary a torque request to maintain a predetermined following distance. Axle torque requests may also include torque increases due to negative wheel slip, such as when a tire of the vehicle slips with respect to the road surface while the torque produced by the engine 102 is negative.

Axle torque requests may also include brake torque management requests and torque requests intended to prevent vehicle over-speed conditions. Brake torque management requests may reduce engine torque to ensure that engine torque does not exceed the ability of the brakes to hold the vehicle when the vehicle is stopped. Axle torque requests may also be made by chassis stability control systems.

The axle torque arbitration module 240 outputs a predicted torque and an immediate torque. The predicted torque is the amount of torque that will be required in the future to meet the driver torque request and/or the driver's speed requests. The immediate torque is the amount of torque required at the present moment to meet temporary torque requests. The immediate torque may be achieved using engine actuators that respond quickly, while slower responding engine actuators may be targeted to achieve the predicted torque.

For example, adjusting the spark timing, the amount of fuel injected by the fuel injection system 120, the timing of fuel injection, and/or cylinder deactivation may be accomplished in a relatively short period of time. Accordingly, the spark timing, the amount of fuel injected, and/or the fuel injection timing may be adjusted to provide the immediate torque. Engine airflow actuators, such as the cam phaser positions, the opening of the throttle valve 112, and boost may require a longer period of time to be adjusted (relative to the fast actuators). Accordingly, the throttle actuator module 113, the phaser actuator module 134, the boost actuator module 144, and/or other engine airflow actuators may be targeted to meet the predicted torque.

The propulsion torque arbitration module 242 arbitrates between the predicted and immediate torque and propulsion torque requests. Propulsion torque requests may include torque reductions for engine over-speed protection, torque reductions during a gear shift, and/or torque increases for stall prevention. Propulsion torque requests may also include torque requests from a speed control module, which may control the EOS during idle, limit the EOS, and/or control the EOS during coastdown, such as when the driver removes their foot from the accelerator pedal. Propulsion torque requests may also include a clutch fuel cutoff, which may reduce engine torque when the driver depresses the clutch pedal in a manual transmission vehicle.

A reserves/loads module 244 selectively adjusts the predicted torque request output by the propulsion torque arbitration module 242 based on reserve torque requests. The reserves/loads module 244 may also selectively adjust the immediate torque request based on load requests. The reserves/loads module 244 outputs the predicted and immediate torque requests to an actuator module 246.

The actuation module 246 generates actuator specific torque requests based on the predicted and/or immediate torque requests. More specifically, the actuation module 246 determines how the predicted and immediate torque requests will be best achieved and generates actuator specific torque requests accordingly.

For example, changing the throttle valve 112 allows for a wide range of torque control. However, opening and closing the throttle valve 112 is relatively slow. Disabling cylinders provides for a wide range of torque control, but may produce drivability and emissions concerns. Changing spark timing is relatively fast, but does not provide much range of control. In addition, the amount of control possible with spark (spark capacity) changes as the amount of air entering the cylinder 116 changes.

The actuation module 246 generates an air torque request that is transmitted to an air control module 248. The air control module 248 determines desired actuator positions for the engine airflow actuators based on the air torque request and generates signals accordingly. For example, the air control module 248 determines a desired area, which corresponds to an opening of the throttle valve 112 at which the air torque request may be produced. The desired area is output to the throttle actuator module 113, which adjusts the throttle valve 112 based on the desired area.

The air control module 248 may also determine a desired air per cylinder (APC) based on the air torque request. The desired APC corresponds to a volume of air within the cylinder 116 at which the air torque request may be produced. A phaser scheduling module 250 determines desired intake and exhaust cam phaser positions based on the desired APC. The phaser actuator module 134 then adjusts the intake and exhaust cam phasers 131 and 132 to create the desired intake and exhaust cam phaser positions.

The air control module 248 may also determine a desired MAP based on the air torque request. The desired MAP corresponds to a MAP at which the air torque request may be produced. The desired MAP is output to a boost scheduling module 252 that controls the boost actuator module 144 based on the desired MAP. The boost actuator module 144 in turn controls the boost device, such as the turbocharger 140 and/or a supercharger. The air control module 248 may also determine desired parameters for other engine airflow actuators, such as an EGR system, The air control module 248 may adjust the torque requests for the engine airflow actuators based on an estimated air torque of the engine 102. The estimated air torque may represent a maximum amount of torque that the engine 102 is immediately capable of producing under the current airflow conditions. The maximum amount of torque may be achieved when the spark timing is set to a calibrated spark timing.

A torque estimation module 254 uses the intake and exhaust cam phaser positions along with the MAF signal to determine the estimated air torque. In other implementations, the torque estimation module 254 may use actual or measured phaser positions. Further discussion of torque estimation can be found in commonly assigned U.S. Pat. No. 6,704,638 entitled "Torque Estimator for Engine RPM and Torque Control," the disclosure of which is incorporated herein by reference in its entirety.

The actuation control module 248 generates torque requests for fast actuators based on the immediate torque request. For example, the actuation control module 248 outputs a spark torque request to a spark control module 256. The spark control module 256 determines a desired spark timing (e.g., advance) based on the spark torque request. The desired spark timing corresponds to a spark timing at which the immediate torque request may be produced. The spark actuator module 125 adjusts the spark timing based on the desired spark timing. The actuation module 246 may also output torque requests to other fast actuators, such as a cylinder deactivation system (not shown).

A fuel/EQR control module 258 determines a desired fuel amount and outputs the desired fuel amount to the fuel injection system 120. The fuel injection system 120 injects the desired amount of fuel. The desired fuel amount corresponds to an amount of fuel to provide an air/fuel mixture having a desired equivalence ratio (EQR) to the engine 102. For example, during normal engine operation, the fuel/EQR control module 258 generally determines the desired fuel amount to provide an air/fuel mixture having a stoichiometric EQR (e.g., EQR of 1.0).

The EQR of a given air/fuel mixture corresponds to a ratio of the respective masses of fuel and air of the air/fuel mixture in relation to the masses of fuel and air of the stoichiometric air/fuel mixture. For example only, the EQR of a given air/fuel mixture may be determined using the equation:

$$EQR = \frac{\left(\frac{m_{fuel}}{m_{O2}}\right)}{\left(\frac{m_{fuel}}{m_{O2}}\right)_{Stoich}},$$

where $m_{fuel}$ is the mass of fuel, $m_{O2}$ is the mass of air, and Stoich is a stoichiometric air/fuel mixture.

Various vehicle systems may request production of a reserve torque. Reserved torque may be used to smooth the torque output of the engine 102 and/or the EOS when torque fluctuations (e.g., sags) would otherwise occur. For example only, a catalyst light-off system may request a reserve torque to perform catalyst light-off. The reserves/loads module 244 selectively adjusts the predicted torque requests based on reserve torques requested to allow for realization of the reserved torque as needed.

Various vehicle systems may also request torque for a load that is applied to the engine 102. For example, a power steering pump (not shown) assists a driver in steering the vehicle. In assisting the driver, however, the power steering pump applies a load to and draws torque from the engine 102. Accordingly, a load request may be made to compensate for the load applied by the power steering pump. The reserves/loads module 244 may selectively increase the immediate torque request based on load requests.

One or more vehicle systems may command changes in the air/fuel mixture, for example, to perform a diagnostic. For example, a catalyst diagnostic module 260 requests a change in the air/fuel mixture. More specifically, the catalyst diagnostic module 260 commands a change in the EQR. In various implementations, the catalyst diagnostic module 260 transitions the EQR from the stoichiometric EQR to a rich EQR (i.e., EQR>stoichiometric EQR), from the rich EQR to a lean EQR, and from the lean EQR back to the stoichiometric EQR. In other implementations, the catalyst diagnostic module 260 transitions the EQR first to the lean EQR and later to the rich EQR.

The catalyst diagnostic module 260 commands the EQR changes to determine the oxygen storage capacity of the catalytic converter 126 and to determine whether the catalytic converter 126 is faulty. Faults may be determined based on the oxygen concentration measurements (OSU and OSD) provided by the upstream and downstream oxygen sensors 127U and 127D, respectively. Further discussion of the operation of the catalyst diagnostic can be found in commonly assigned U.S. patent application Ser. No. 11/145,284, filed Jun. 3, 2005, the disclosure of which is expressly incorporated herein by reference in its entirety.

Figure 3:
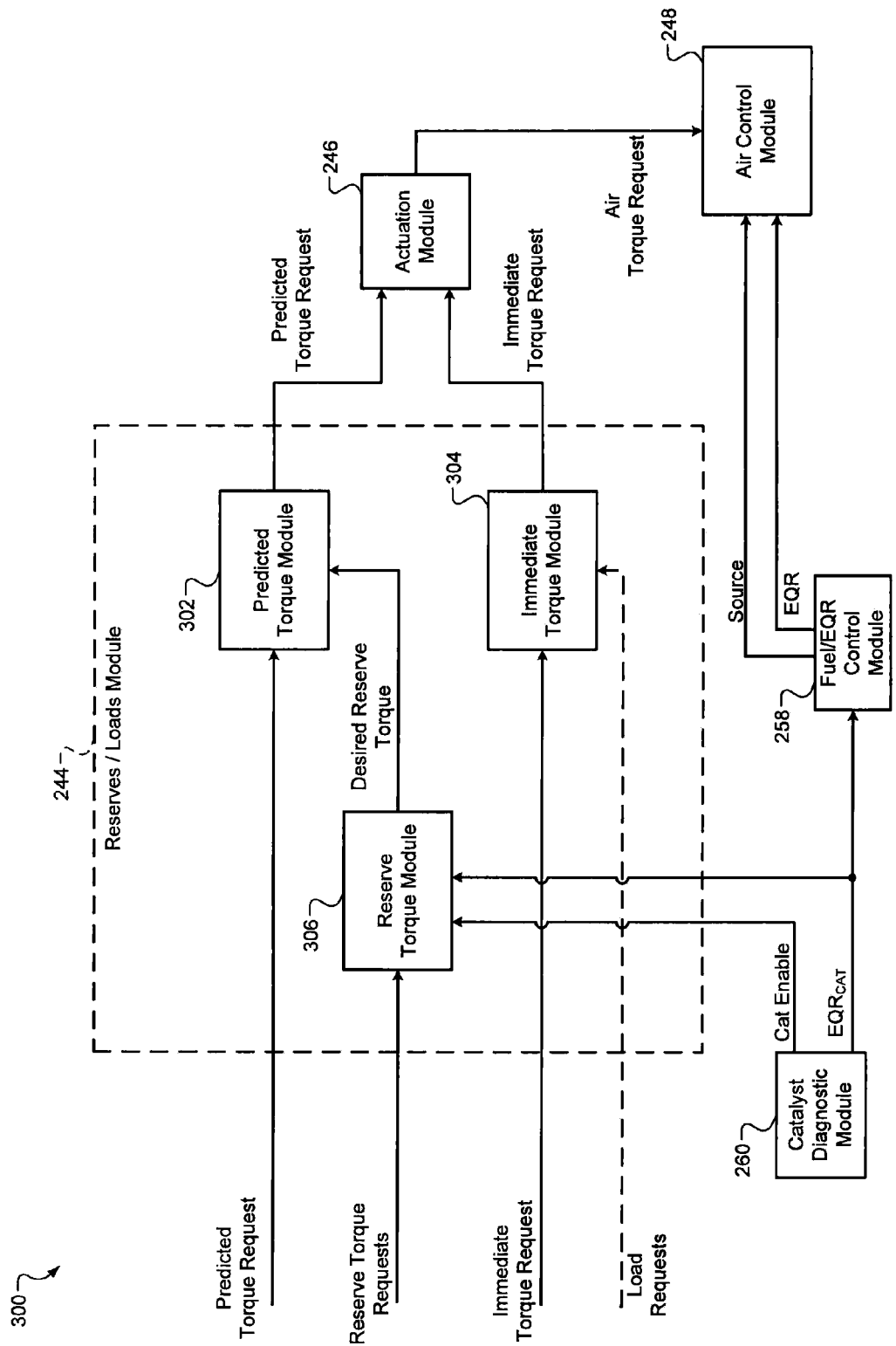
FIG. 3 is a functional block diagram of an exemplary reserve torque system according to the principles of the present disclosure.

Referring now to FIG. 3, a functional block diagram of an exemplary reserve torque system 300 is presented. The reserves/loads module 244 according to the present disclosure creates a reserve torque before a lean EQR command is executed. While the principles of the present disclosure will be discussed as they relate to a lean EQR command from the catalyst diagnostic module 260, the principles of the present application are also applicable other commands to adjust the EQR to a lean EQR.

The reserves/loads module 244 includes a predicted torque module 302, an immediate torque module 304, and a reserve torque module 306. The reserves/loads module 244 may also include a timer (not shown). The predicted and immediate torque modules 302 and 304 receive the predicted and immediate torque requests, respectively, from the propulsion torque arbitration module 242.

The predicted torque module 302 outputs the predicted torque request based on the predicted torque request from the propulsion torque arbitration module 242. Likewise, the immediate torque module 304 outputs the immediate torque request based on the immediate torque request from the propulsion torque arbitration module 242. The immediate torque module 304 may selectively adjust the immediate torque request based on load requests.

The reserve torque module 306 selectively instructs the predicted torque module 302 to adjust (e.g., increase) the predicted torque request based on reserve torque requests. Reserve torque requests may include, for example, a reserve request for idling, traction control, and/or transmission related reserve torque requests. Other reserve torque requests may include a reserve torque request for engaging of the air conditioning compressor clutch, for engaging of a generator (e.g., alternator or belt alternator starter), to warm a catalyst of the exhaust system 124, and/or to purge air trapped within a fuel system.

The reserve torque module 306 determines a desired reserve torque based on the reserve torque requests. For example only, the desired reserve torque may be determined based on one of the reserve torque request having the largest magnitude. Alternatively, the desired reserve torque may be determined as a sum of one or more of the reserve torque requests.

The reserve torque module 306 outputs the desired reserve torque to the predicted torque module 302. The predicted torque module 302 determines and outputs the predicted torque request to create the desired reserve torque. More specifically, the predicted torque module 302 increases the predicted torque request based on the desired reserve torque. For example only, the predicted torque module 302 may sum the desired reserve torque and the predicted torque request from the propulsion torque arbitration module 242.

The predicted torque module 302 outputs the predicted torque request to the actuation module 246, which controls the air torque request based on the predicted torque request. Accordingly, the actuation module 246 increases the air torque request when the reserve torque is requested. The air control module 248 then increases one or more engine airflow parameter (e.g., throttle opening) based on the increased air torque request. The maximum amount of torque that the engine 102 could produce (i.e., the estimated air torque) also increases under the increased engine airflow conditions.

To offset the increase in the estimated air torque, the actuation module 246 decreases the spark torque request, which causes the spark control module 256 to adjust the spark timing. More specifically, the spark control module 256 retards the spark timing. In this manner, the spark timing is adjusted to offset the increase in torque output that would otherwise occur under the increased engine airflow conditions. Retarding the spark timing reserves torque, which can be rapidly realized by advancing the spark timing.

As stated above, the catalyst diagnostic module 260 requests a reserve torque to perform a diagnostic regarding reliability of one or more of the catalysts within the catalytic converter 126. The catalyst diagnostic module 260 may perform this diagnostic at a predetermined time, such as while the engine 102 is idling. For example only, the diagnostic, and therefore the reserve torque, may be requested a predetermined period after the engine 102 is started. The diagnostic may be performed by adjusting the EQR in a predetermined sequence, such as from a lean EQR to a rich EQR, or from a rich EQR to a lean EQR. However, adjusting the EQR from a non-lean EQR to a lean EQR causes a sag (i.e., decrease) in torque output by the engine 102.

The catalyst diagnostic module 260 generates an enable signal (i.e., Cat Enable) before the catalyst diagnostic is performed. More specifically, the catalyst diagnostic module 260 generates the enable signal before the EQR is transitioned to the lean EQR. The catalyst diagnostic module 260 also generates an EQR signal (i.e., $EQR_{CAT}$) that corresponds to the lean EQR that the EQR will be transitioned to. The enable signal and the EQR signal are provided to the reserve torque module 306.

The reserve torque module 306 according to the present disclosure determines the desired reserve torque for the lean EQR when the enable signal is generated. For example only, the desired reserve torque for the lean EQR may be determined based on the lean EQR that the EQR will be transitioned to. In various implementations, the desired reserve torque may be determined based on a lookup table of desired reserve torques indexed by EQR. For example only, the desired reserve torque may increase as the lean EQR requested becomes more lean.

The reserve torque module 306 outputs the desired reserve torque for the lean EQR to the predicted torque module 302, which adjusts the predicted torque request based on the desired reserve torque. In this manner, the reserve torque module 306 increases at least one engine airflow parameter to create the reserve torque for the lean EQR.

Assuming that the immediate torque request is steady-state, the actuation module 246 decreases the spark torque request, which causes retarding of the spark timing. Retarding the spark timing offsets the increase in torque output that would otherwise be experienced due to the increase engine airflow parameters. The EQR is maintained at the stoichiometric EQR while the engine airflow parameters are increasing.

When the reserve torque for the lean EQR has been created, the reserve torque module 306 allows the EQR to be transitioned. For example only, the catalyst diagnostic module 260 may assume that the reserve torque has been created a predetermined period after the increased predicted torque request was generated. The predetermined period may be determined based on, for example, the magnitude of the reserve torque, the change in the predicted torque request, the change in the air torque request, the lean EQR, and/or the change in the engine airflow parameters necessary to effectuate the reserve torque.

The catalyst diagnostic module 260 adjusts the EQR via the fuel/EQR control module 258. More specifically, the fuel/EQR control module 258 adjusts the EQR based on the $EQR_{CAT}$ when commanded by the catalyst diagnostic module 260. When the fuel/EQR control module 258 adjusts the EQR based on the EQR commanded by the catalyst diagnostic module 260, the fuel/EQR control module 258 may transmit an EQR signal to the air control module 248 that corresponds to the commanded EQR. The air control module 248 may use the EQR signal ensuring that the commanded EQR is achieved.

The fuel/EQR control module 258 may also transmit a source signal to the air control module 248 when the catalyst diagnostic module 260 commands the EQR transitions. The source signal indicates that the catalyst diagnostic module 260 is then controlling the EQR. The air control module 248 may thereafter ignore any changes in the air torque request until control of the EQR returns to normal operation.

Figure 4:
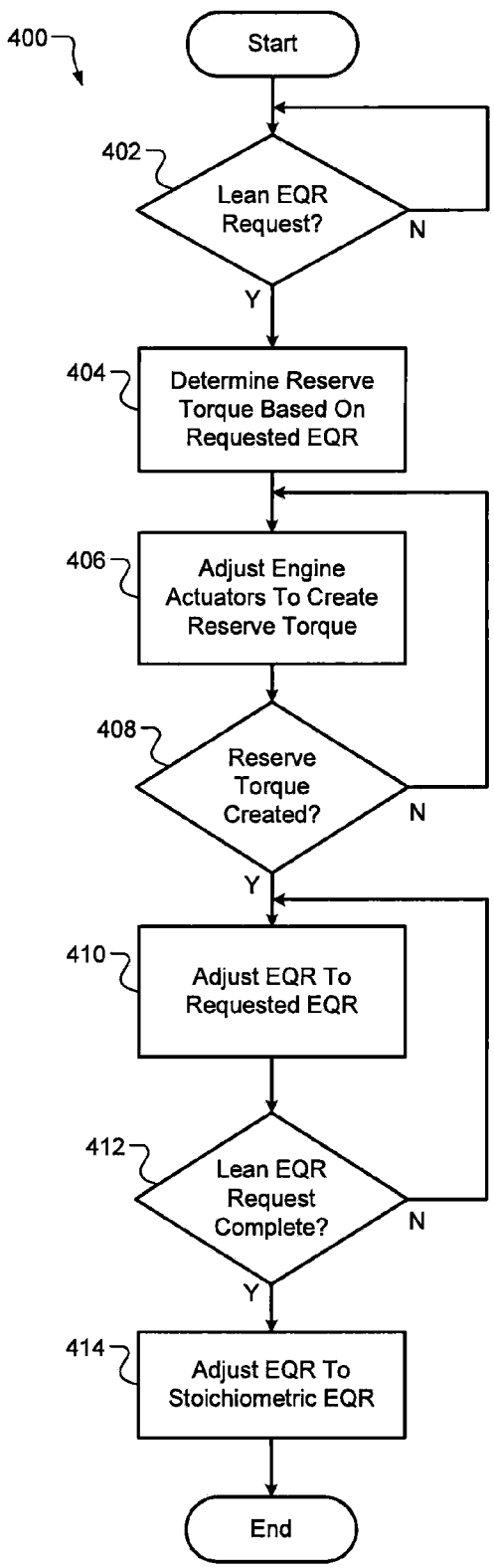
FIG. 4 is a flow diagram depicting exemplary steps performed by the reserve torque system according to the principles of the present disclosure.

Referring now to FIG. 4, a method 400 depicting exemplary steps performed by the ECM 114 is presented. One or more of the steps of the method 400 may be combined or performed simultaneously without altering the principles of the present disclosure. The method 400 may be performed in one or more different modules of the ECM 114.

Control begins in step 402 where control determines whether a lean EQR request is present. If true, control continues to step 404; otherwise, control remains in step 402. For example only, a lean EQR request is a request to change the EQR to a lean EQR (e.g., an EQR<stoichiometric EQR). The lean EQR request may be from, for example, the catalyst diagnostic module 260. The EQR may also be transitioned to a rich EQR before being transitioned to the lean EQR.

In step 404, control determines a reserve torque based on the lean EQR requested. Control also commands the creation of the reserve torque in step 404. Control continues in step 406 where control adjusts one or more engine airflow parameters and the spark timing to create the reserve torque for the lean EQR requested. More specifically, control increases the engine airflow parameters and retards the spark timing to create the reserve torque. The engine airflow parameters adjusted may include throttle opening area, opening of the intake and/or exhaust valves 118 and 122, the boost device, and/or other engine airflow parameters.

Control continues in step 408 where control determines whether the reserve torque has been created. If true, control proceeds to step 410; otherwise, control returns to step 406. For example only, control may determine that the reserve torque has been created after a predetermined period of time passes after the creation of the reserve torque is commanded. Alternatively, control may determine that the reserve torque has been created when the difference between the immediate torque and the estimated torque is approximately equal to the reserve torque.

In step 410, control adjusts the EQR to the lean EQR requested. In some circumstances, such as in the case of the catalyst diagnostic module 260, control may adjust the EQR to a rich EQR before the transition to the lean EQR. In this manner, control adjusts the EQR to the lean EQR after the reserve torque has been created. In other words, control creates the reserve torque for the lean EQR before the EQR is adjusted to the lean EQR. The reserve torque can then be rapidly utilized to smooth the torque output of the engine 102 and/or the EOS. Control continues in step 412 where control determines whether the lean EQR request is complete. If true, control proceeds to step 414; otherwise, control returns to step 410 and maintains the lean EQR.

In step 414, control returns to normal operation and adjusts the EQR based on the stoichiometric EQR. Control then ends. In this manner, the engine airflow parameters remain unchanged while the EQR controlled at a non-stoichiometric EQR. Constant engine airflow parameters may be desirable depending on the reason for the lean EQR request.

For example only, constant engine airflow parameters may aid the catalyst diagnostic, as a change in airflow may incorrectly cause a diagnosis of a fault in the catalytic converter 126 that may be attributable to the change in airflow. While FIG. 4 shows control ending after step 414, control may return to step 402 and repeat the steps of FIG. 4 continuously during operation of the engine 102 when a lean EQR request is generated.

Referring now to FIGS. 5A-5E, exemplary illustrations of various approaches employed by reserve torque systems are presented. Exemplary trace 502 tracks the EQR of the air/fuel mixture supplied to the engine 102 for combustion. Exemplary trace 504 tracks the state of the enable signal for a lean EQR request, such as the enable signal from the catalyst diagnostic module 260.

Exemplary trace 506 tracks the estimated air torque of the engine 102. The estimated air torque 506 corresponds to a maximum amount of torque that the engine 102 is capable of producing under the current engine airflow conditions. Exemplary trace 508 tracks the air torque request. The estimated air torque 506 generally lags behind the air torque request 508 due to a delay that is attributable to the period necessary for air to be ingested into the engine 102 (i.e., the cylinders). Exemplary trace 510 tracks a base (e.g., idle) spark timing and exemplary trace 512 tracks the spark timing.

In various implementations, a reserve torque may have already been created when an EQR change to a lean EQR is commanded. For example, an idle reserve torque is likely present during times when the catalyst diagnostic is performed. The base spark timing 510 represents the spark timing to accommodate preexisting reserve torques, such as the idle reserve torque. The spark timing 512 may also be retarded from the MBT timing to the base spark timing 510, for example, to prevent knocking.

Figure 5A:
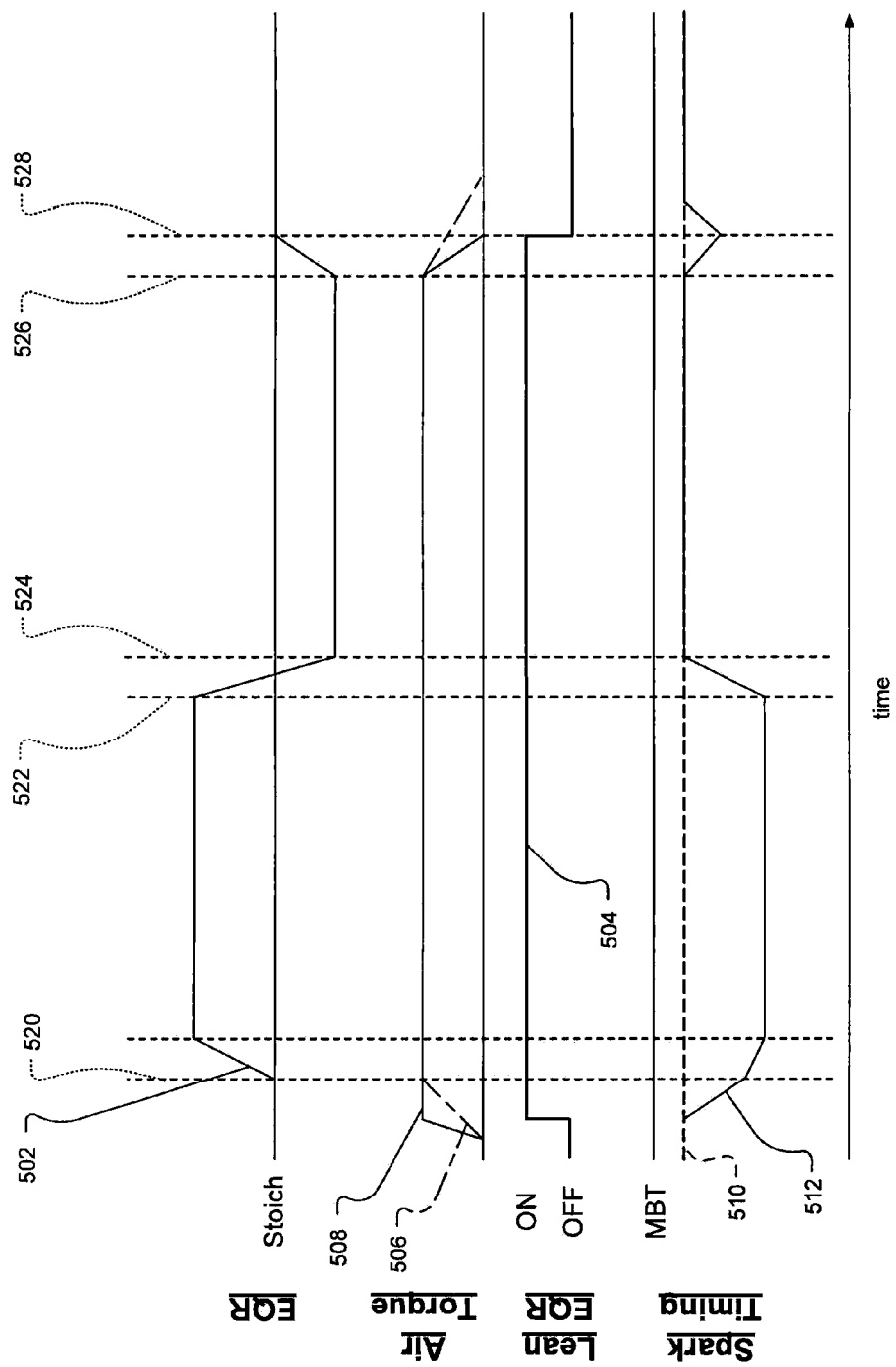
FIGS. 5A-5E are exemplary illustrations of operations of reserve torque systems according to the principles of the present disclosure.

Referring to FIG. 5A, the lean EQR request 504 is generated before time 520, indicating an upcoming transition to a lean EQR. The desired reserve torque is determined and the air torque request 508 is increased. The estimated air torque 506 increases as the engine airflow parameters increase based on the air torque request 508. The spark timing 512 is retarded while the estimated air torque 506 increases.

In some instances, another EQR change may be commanded before the EQR 502 is transitioned to the lean EQR command is executed. For example, in FIG. 5A, the EQR 502 is commanded to a rich EQR (i.e., EQR>stoichiometric EQR) before the lean EQR command is executed. The EQR 502 is transitioned to the rich EQR starting at time 520, the time at which the estimated air torque 506 reaches the air torque request 508.

As the estimated air torque 506 increases, the rich EQR supplied to the engine 102 after time 520 would cause an increase in torque output. The spark timing 512, however, is further retarded to offset the increase in torque output that would otherwise occur. In this manner, the desired reserve torque is created before the EQR is transitioned to the lean EQR. An additional reserve torque (a fuel reserve torque) is created by the excess fuel supplied to create the rich EQR.

Between times 522 and 524, the EQR 502 is transitioned from the rich EQR to the lean EQR. The reserved torque can be utilized to smooth the torque output, which would otherwise decrease. In other words, the spark timing 512 is advanced to increase and smooth the torque output as the EQR transitions toward the lean EQR. The air torque request

508 is maintained during the transition. In this manner, the engine airflow parameters remain unchanged during the transition.

Starting at time 526, the EQR 502 is transitioned back to the stoichiometric EQR (i.e., EQR approximately 1.0). The air torque request 508 is decreased, the estimated air torque 506 decreases, and the spark timing 512 is retarded. The EQR 502 reaches the stoichiometric EQR at time 528, while the estimated air torque 506 is decreasing toward the air torque request 508. The spark timing 512 is advanced to offset the decrease in torque output that would otherwise occur due to the decreasing engine airflow parameters. The approach illustrated in FIG. 5A may require a significant retard of the spark timing and may decrease fuel economy. However, engine airflow parameters are maintained during the EQR 502 transitions.

Figure 5B:
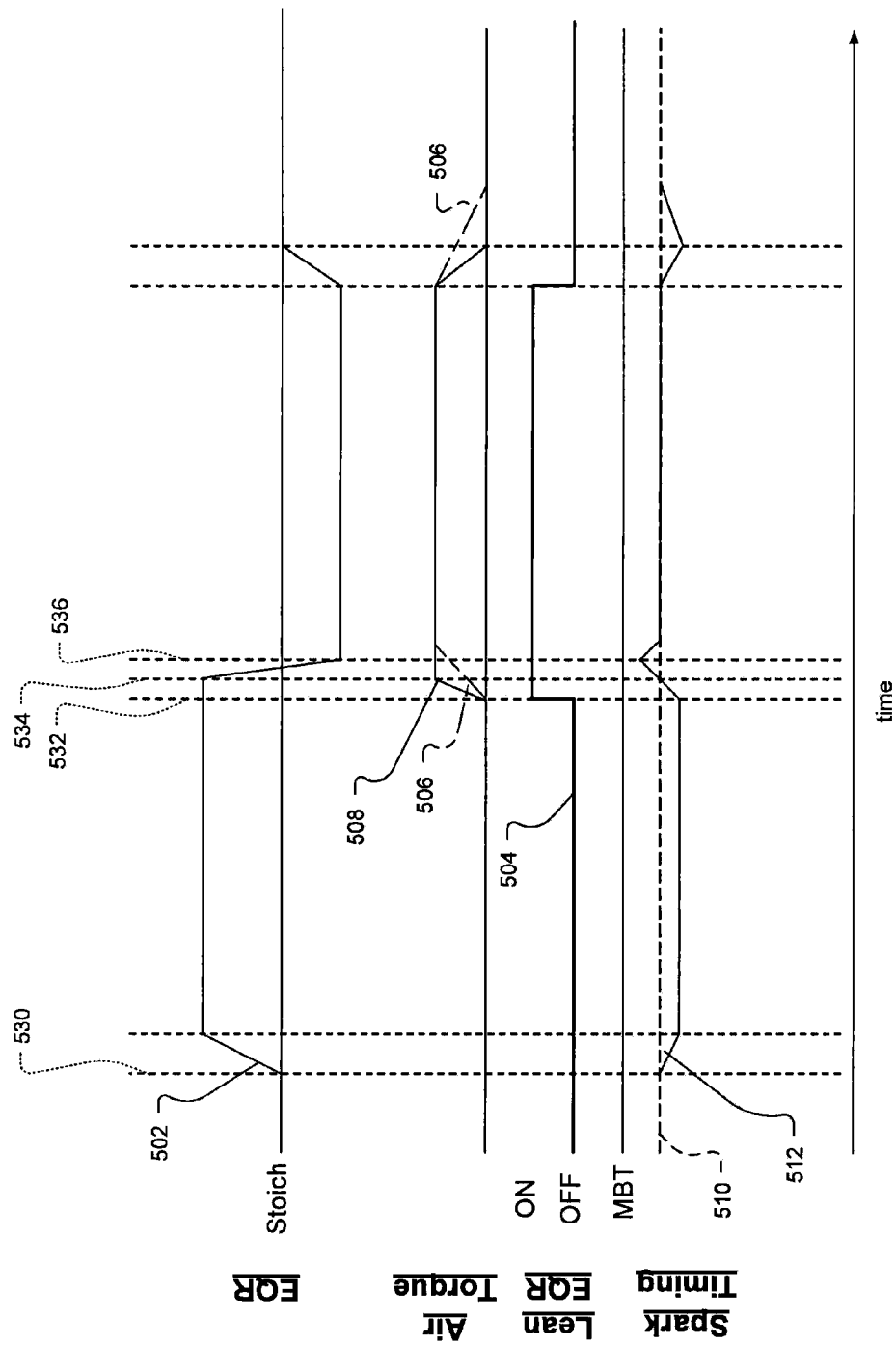

Referring to FIG. 5B, the EQR 502 is again commanded to the rich EQR before the lean EQR command is executed. In FIG. 5B, however, the air torque request 508 is not increased while the rich EQR is supplied to the engine 102. Instead, the amount of fuel supplied is increased, thereby creating the rich EQR. The spark timing 512 is retarded as the EQR 502 transitions to the rich EQR, thereby creating a reserve torque (a fuel reserve torque).

At time 532, the lean EQR request 504 is generated, signaling an upcoming EQR transition to a lean EQR. Accordingly, the air torque request 508 is increased to create the reserve torque for the lean EQR. The estimated air torque 506 increases as the engine airflow parameters increase based on the air torque request 508. Between times 532 and 534, the spark timing 512 is advanced, utilizing the reserved torque created by the rich EQR.

The EQR 502 begins transitioning to the lean EQR after time 534 and the spark timing 512 is further advanced to offset the decrease in torque output that may otherwise occur due to the lean EQR. After time 536, when the torque output stabilizes, the spark timing 512 may then be retuned to the base (e.g., idle) spark timing 510.

The approach illustrated in FIG. 5B may require the spark timing 512 to be advanced beyond the base spark timing 510. Such an advance may affect the system for which the base spark timing 510 was employed. Additionally, the engine airflow parameters are changing (increasing) while the EQR 502 is lean. However, maintaining the engine airflow parameters while the EQR 502 is rich may increase fuel economy.

Referring now to FIG. 5C, the EQR 502 is again commanded to the rich EQR before the lean EQR request 504 is executed. Before time 540, the EQR 502 transitions to the rich EQR. To offset the increase in torque output that would otherwise occur, the spark timing 512 is retarded as the EQR 502 increases, thereby creating a reserve torque (a fuel reserve torque). The air torque request 508, however, is maintained while the EQR is rich.

The lean EQR request 504 is enabled at time 542, and the air torque request 508 is increased. The engine airflow parameters and the estimated air torque 506 accordingly increase toward the air torque request 508. As the engine airflow parameters increase, the spark timing 512 is retarded, thereby increasing the reserve torque. In this manner, the reserve torque for the lean EQR is created before the EQR is transitioned to the lean EQR.

The estimated air torque 506 reaches the air torque request 508 at time 546. The EQR 502 is transitioned to the lean EQR beginning at time 546. As the EQR 502 transitions to the lean EQR, the spark timing 512 is advanced until time 548 when the EQR 502 reaches the lean EQR.

Figure 5C:
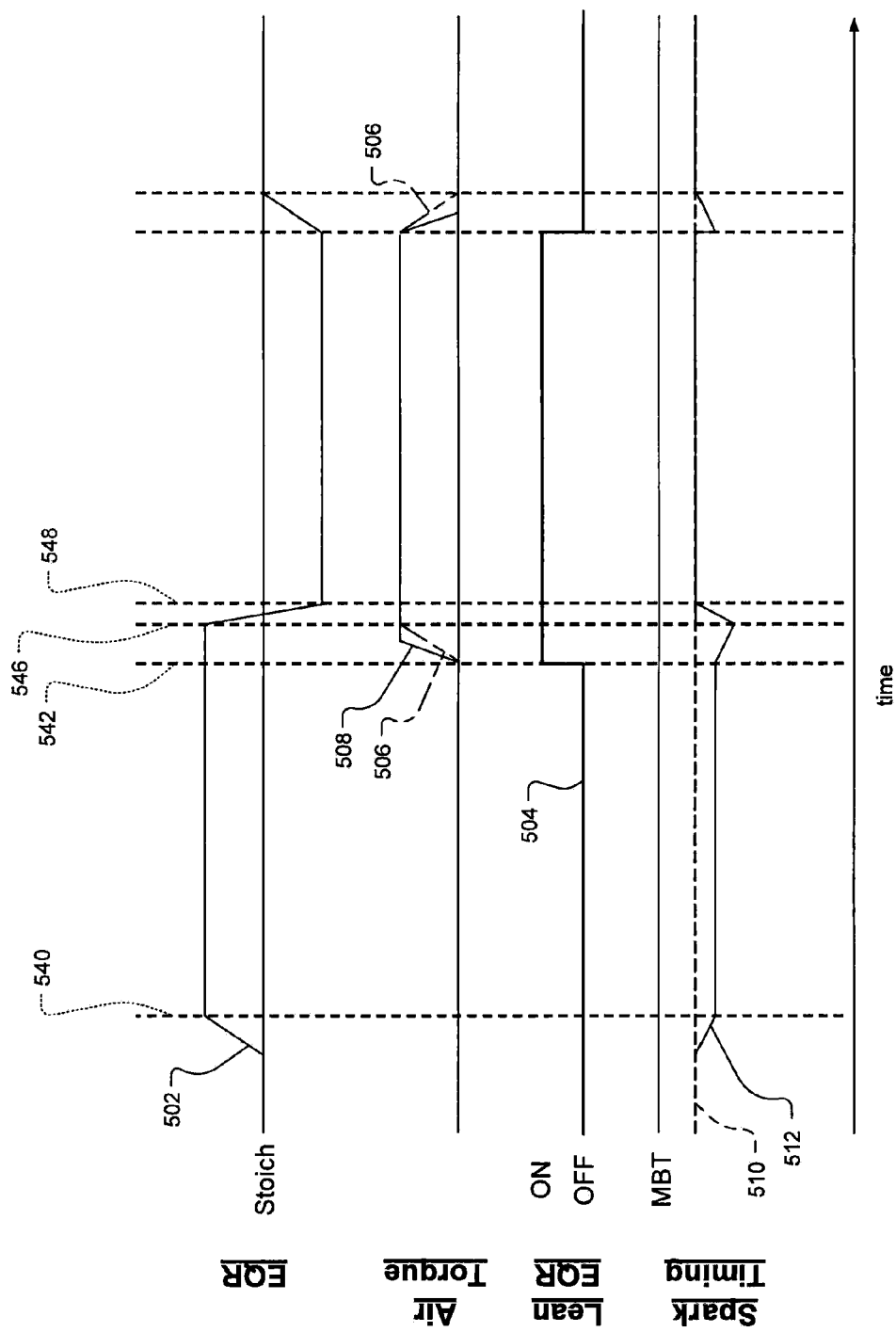

The approach illustrated in FIG. 5C may increase fuel economy as the air torque request 508 and the engine airflow parameters are maintained before time 542. Additionally, the engine airflow parameters are maintained while the EQR 502 is lean. The time when the EQR 502 is commanded to the lean EQR, however, may need to be delayed for the creation of the reserve torque.

Figure 5D:
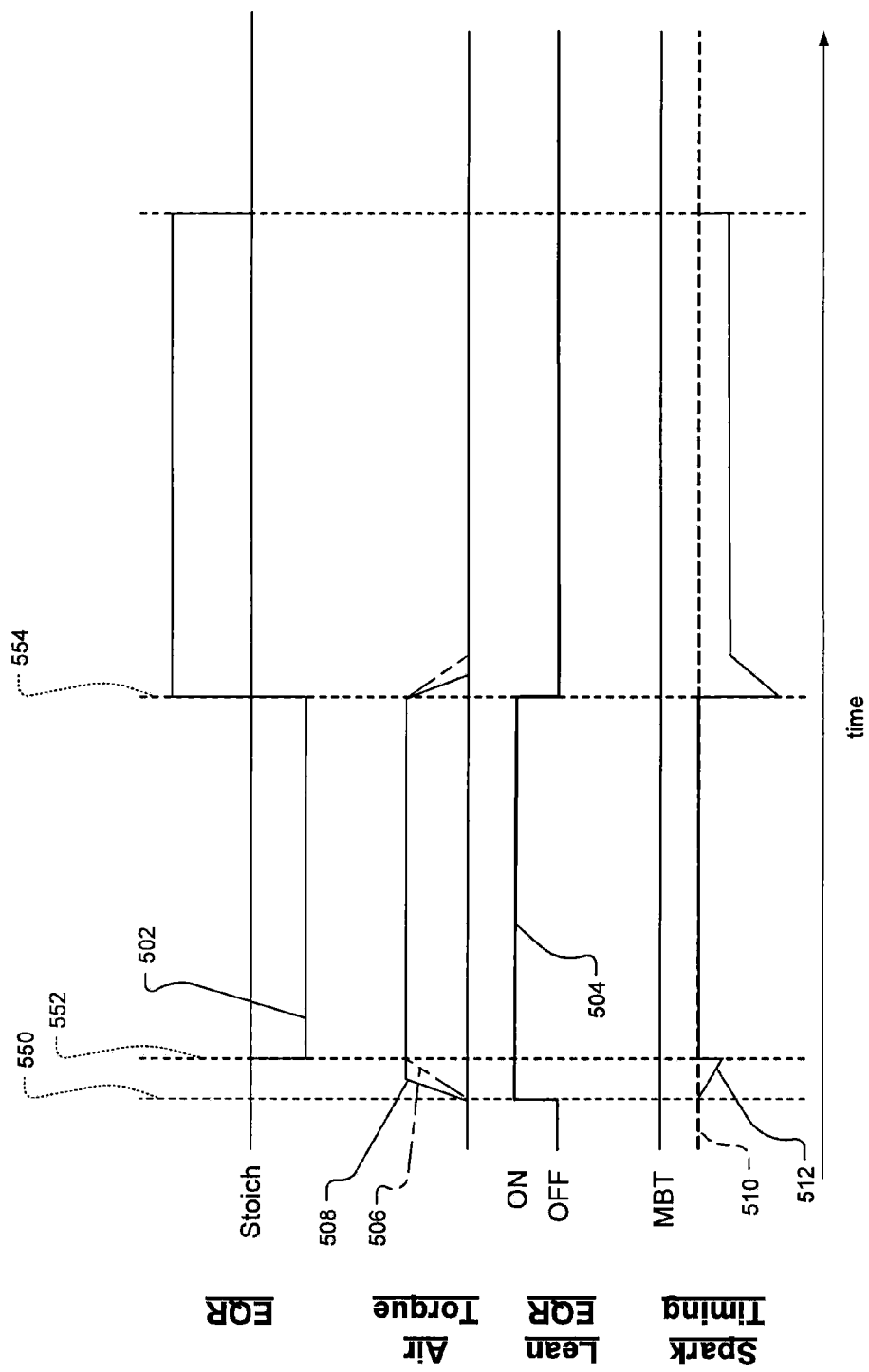

Unlike FIGS. 5A-5C, in FIG. 5D, the EQR 502 may be commanded to the lean EQR before being commanded to the rich EQR. The lean EQR request 504 is enabled at time 550, and the air torque request 508 is increased. The estimated air torque 506 accordingly increases, and the spark timing 512 is retarded to offset the increase in torque output that would otherwise occur. This retardation of the spark timing 512 coupled with the increased engine airflow parameters creates the reserve torque for the lean EQR.

At time 552, the time when the estimated air torque 506 reaches the air torque request 508, the EQR 502 is transitioned to the lean EQR. At this time, the spark timing 512 is advanced to increase the torque output and offset the decrease that would occur due to the lean EQR transition. The air torque request 508 and the spark timing 512 are maintained until time 554 when the EQR 502 transitions from the lean EQR. At time 554, the EQR 502 is transitioned to the rich EQR. The air torque request 508 is decreased and the spark timing 512 is adjusted as the engine airflow parameters decrease to smooth torque output.

Figure 5E:
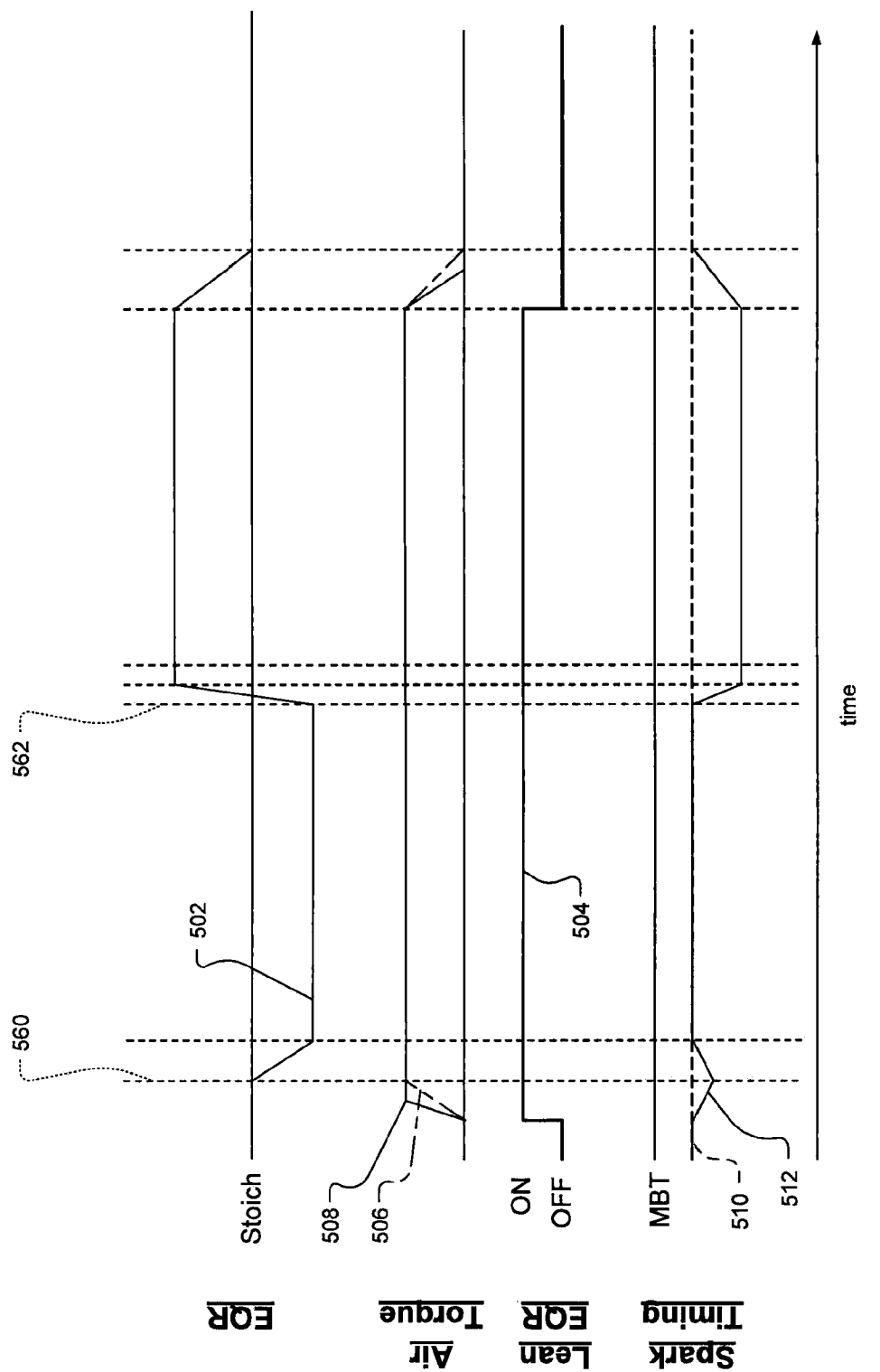

Referring now to FIG. 5E, like FIG. 5D, the lean EQR is commanded before the EQR 502 is transitioned to the rich EQR. Before time 560, the lean EQR request 504 is enabled. The air torque request 508 is increased. The estimated air torque 506 increases accordingly and the spark timing 512 is retarded, thereby creating the reserve torque for the upcoming lean EQR.

Starting at time 560, the EQR 502 is transitioned to the lean EQR. During the transition, the reserved torque is utilized to offset the torque output sag that would otherwise occur. More specifically, the spark timing 512 is advanced, which offsets the torque output decrease that would otherwise be attributable to the lean EQR. The air torque request 508 is maintained throughout a later EQR transition to the rich EQR, which begins at time 562. The spark timing 512 is retarded as the EQR 502 transitions to the rich EQR to offset the increase in torque output that would otherwise occur.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A reserve torque system comprising:
    a first module that generates a first signal a predetermined period before an equivalence ratio (EQR) of an air/fuel mixture supplied to an engine is transitioned from a non-lean EQR to a lean EQR; and
    a reserve torque module that creates a reserve torque between when said first signal is generated and when said EQR is transitioned to said lean EQR.

2. The reserve torque system of claim 1 further comprising an actuation module that increases at least one engine airflow parameter and retards spark timing before said EQR is transitioned to said lean EQR.

3. The reserve torque system of claim 2 wherein said actuation module maintains said at least one engine airflow parameter until said EQR is transitioned from said lean EQR to a second non-lean EQR.

4. The reserve torque system of claim 3 wherein said first module transitions said EQR from said non-lean EQR to a rich EQR during a first period and transitions said EQR from said rich EQR to said lean EQR during a second period that is after said first period,
wherein said non-lean EQR is a stoichiometric EQR, and
wherein said actuation module increases said at least one engine airflow parameter before said first period and maintains said at least one engine airflow parameter until said EQR is transitioned from said lean EQR to said second non-lean EQR.

5. The reserve torque system of claim 4 wherein said actuation module retards said spark timing when said at least one engine airflow parameter increases and further retards said spark timing while said EQR transitions from said non-lean EQR to said rich EQR.

6. The reserve torque system of claim 1 wherein said first module generates a second signal based on said lean EQR, and
wherein said reserve torque module creates said reserve torque based on said second signal.

7. The reserve torque system of claim 1 wherein said first module transitions said EQR to said lean EQR after said reserve torque is created.

8. The reserve torque system of claim 1 wherein said first module transitions said EQR to said lean EQR a predetermined period after said first signal is generated.

9. The reserve torque system of claim 1 wherein said first module selectively diagnoses a fault in a catalyst associated with said engine after said EQR is transitioned to said lean EQR.

10. The reserve torque system of claim 9 wherein said first module selectively diagnoses said fault based on a change in oxygen of exhaust gas measured after said EQR is transitioned to said lean EQR.

11. A method comprising:
generating a first signal a predetermined period before an equivalence ratio (EQR) of an air/fuel mixture supplied to an engine is transitioned from a non-lean EQR to a lean EQR; and
creating a reserve torque between when said first signal is generated and when said EQR is transitioned to said lean EQR.

12. The method of claim 11 further comprising:
increasing at least one engine airflow parameter before said EQR is transitioned to said lean EQR; and
retarding spark timing before said EQR is transitioned to said lean EQR.

13. The method of claim 12 further comprising maintaining said at least one engine airflow parameter until said EQR is transitioned from said lean EQR to a second non-lean EQR.

14. The method of claim 13 further comprising:
transitioning said EQR from said non-lean EQR to a rich EQR during a first period, wherein said non-lean EQR is a stoichiometric EQR;
transitioning said EQR from said rich EQR to said lean EQR during a second period that is after said first period;
increasing said at least one engine airflow parameter before said first period; and
maintaining said at least one engine airflow parameter until said EQR is transitioned from said lean EQR to said second non-lean EQR.

15. The method of claim 14 further comprising:
retarding said spark timing as said at least one engine airflow parameter increases; and
further retarding said spark timing as said EQR transitions from said non-lean EQR to said rich EQR.

16. The method of claim 11 further comprising:
generating a second signal based on said lean EQR; and
creating said reserve torque based on said second signal.

17. The method of claim 11 further comprising transitioning said EQR to said lean EQR after said reserve torque is created.

18. The method of claim 11 further comprising transitioning said EQR to said lean EQR a predetermined period after said first signal is generated.

19. The method of claim 11 further comprising selectively diagnosing a fault in a catalyst associated with said engine after said EQR is transitioned to said lean EQR.

20. The method of claim 19 further comprising selectively diagnosing said fault based on a change in oxygen of exhaust gas measured after said EQR is transitioned to said lean EQR.

* * * * *